United States Patent
Booth et al.

(10) Patent No.: US 11,616,465 B2
(45) Date of Patent: Mar. 28, 2023

(54) SPREAD-SPECTRUM CONTROL FOR AN INVERTER FOR CONTROLLING AN ELECTRIC MACHINE

(71) Applicant: Deere & Company, Moline, IL (US)

(72) Inventors: Brian J. Booth, West Fargo, ND (US); Long Wu, Fargo, ND (US); Dan Li, Fargo, ND (US); Roger K. Amundson, West Fargo, ND (US); Zack M. Day, Gardner, ND (US)

(73) Assignee: Deere & Company, Moline, IL (US)

( * ) Notice: Subject to any disclaimer, the term of this patent is extended or adjusted under 35 U.S.C. 154(b) by 82 days.

(21) Appl. No.: 17/301,140

(22) Filed: Mar. 26, 2021

(65) Prior Publication Data
US 2022/0021326 A1   Jan. 20, 2022

Related U.S. Application Data

(60) Provisional application No. 62/705,793, filed on Jul. 15, 2020.

(51) Int. Cl.
*H02M 7/537* (2006.01)
*H02P 27/08* (2006.01)

(52) U.S. Cl.
CPC ................................ *H02P 27/085* (2013.01)

(58) Field of Classification Search
CPC ........................... H02P 27/085; H02M 7/537
See application file for complete search history.

(56) References Cited

U.S. PATENT DOCUMENTS

| | | |
|---|---|---|
| 5,488,627 A | 1/1996 | Hardin et al. |
| 6,433,507 B1 | 8/2002 | Makaran et al. |
| 2003/0052642 A1 | 3/2003 | Kerkman et al. |
| 2014/0265975 A1* | 9/2014 | Holmes ................. B60L 15/20 318/452 |
| 2016/0006367 A1* | 1/2016 | Wei ...................... H02M 7/537 363/131 |

FOREIGN PATENT DOCUMENTS

| | | |
|---|---|---|
| DE | 102015216292 A1 | 4/2016 |
| EP | 1914874 A2 | 4/2008 |

OTHER PUBLICATIONS

Extended European Search Report and Written Opinion issued in European Patent Application No. 21183589.7, dated Nov. 30, 2021, in 07 pages.
P. G. Handley, Spread spectrum switching: a low noise modulation technique for PWM inverter drives, dated 1990, pp. 1-171, [online]. Retrieved from the internet <URL: https://researchspace.auckland.ac.nz/handle/2292/2230>.

* cited by examiner

*Primary Examiner* — Cortez M Cook

(57) ABSTRACT

An electronic data processor comprises a data storage device in communication with the electronic data processor. A control module stored in the data storage device, the control module comprising software instructions for execution by the electronic data processor to change dynamically the fundamental switching frequency of the control signals to reduce electromagnetic noise within a target frequency band if the fundamental switching frequency is equal to or greater than a threshold fundamental switching frequency.

14 Claims, 8 Drawing Sheets

US 11,616,465 B2

SPREAD-SPECTRUM CONTROL FOR AN INVERTER FOR CONTROLLING AN ELECTRIC MACHINE

RELATED APPLICATION

This document (including the drawings) claims priority and the benefit of the filing date based on U.S. provisional application No. 62/705,793, filed Jul. 15, 2020 under 35 U.S.C. § 119 (e), where the provisional application is hereby incorporated by reference herein.

DISCLOSURE

This disclosure relates to spread-spectrum control for an inverter for controlling an electric machine.

BACKGROUND

In certain prior art, an inverter converts direct current (DC) input electric energy to alternating current (AC) output electric energy to control an electric machine in a motoring mode. Conversely, in a generating mode, a bi-directional configuration of the inverter supports converting alternating current (AC) electrical energy into direct current (DC) electrical energy.

In some prior art, the alternating current (AC) operates at a fundamental switching frequency, such as a continuous or uniform fundamental switching frequency that produces unwanted electromagnetic interference or noise within a confined or limited frequency range, which is usually related to a harmonic of the fundamental frequency. An output filter may be used at the output terminals of the inverter to reduce the unwanted electromagnetic interference or noise, but the output filter results in extra cost, weight, thermal dissipation, and/or unintended attenuation or phase distortion of the alternating current signal. Further, unintended attenuation or phase distortion may reduce the potential accuracy of control and/or rotor position sensing of the electric machine. Accordingly, there is a need for spread-spectrum control for an inverter for controlling an electric machine to eliminate or reduce the need for such output filters.

SUMMARY

In accordance with one embodiment, an inverter for controlling an electric machine comprises a switching circuit comprising a low-side switch and a high-side switch. The low-side switch and the high-side switch each have a control terminal and two switched terminals. A driver circuit is configured to provide control signals to the control terminals of the switching circuit, where the driver circuit can operate at a fundamental switching frequency of the control signals. A controller comprises a data storage device in communication with an electronic data processor. A control module is stored in the data storage device. The control module comprises software instructions for execution by the electronic data processor to change dynamically the fundamental switching frequency of the control signals to reduce electromagnetic noise within a target frequency band if the fundamental switching frequency is equal to or greater than a threshold fundamental switching frequency.

DETAILED DESCRIPTION

As used in this document, a module means software, electronics, or both, where software can include software instructions, executable files, data structures, and libraries, among other things. The blocks in block diagrams may represent modules. The lines that interconnect the blocks in the block diagrams may represent any of the following: physical communication lines, transmission lines, microstrip, stripline, conductive traces on circuit boards, coaxial cable, conductors, cables, or wires; analog signals, digital signals, logic level signals, Boolean logic signals, data messages, data communications, system calls, calls between software modules, dynamic linking between software modules, static linking between software modules, compiling software in one or more executable files, and communications of data between software modules.

As used in this document, configured to, adapted to, and arranged to may refer any of the following items: (1) software or program instructions that are stored in the data storage device or other data storage and executable by the data processor to perform certain functions, software, (2) software or embedded firmware that are stored in a controller, a driver, an inverter or its or their memory or data storage to perform certain functions, or (3) electronic, electrical circuits, logic circuits, digital logic circuits, or modules that can perform substantially equivalent functions to the software, embedded firmware or program instructions.

Figure 1:
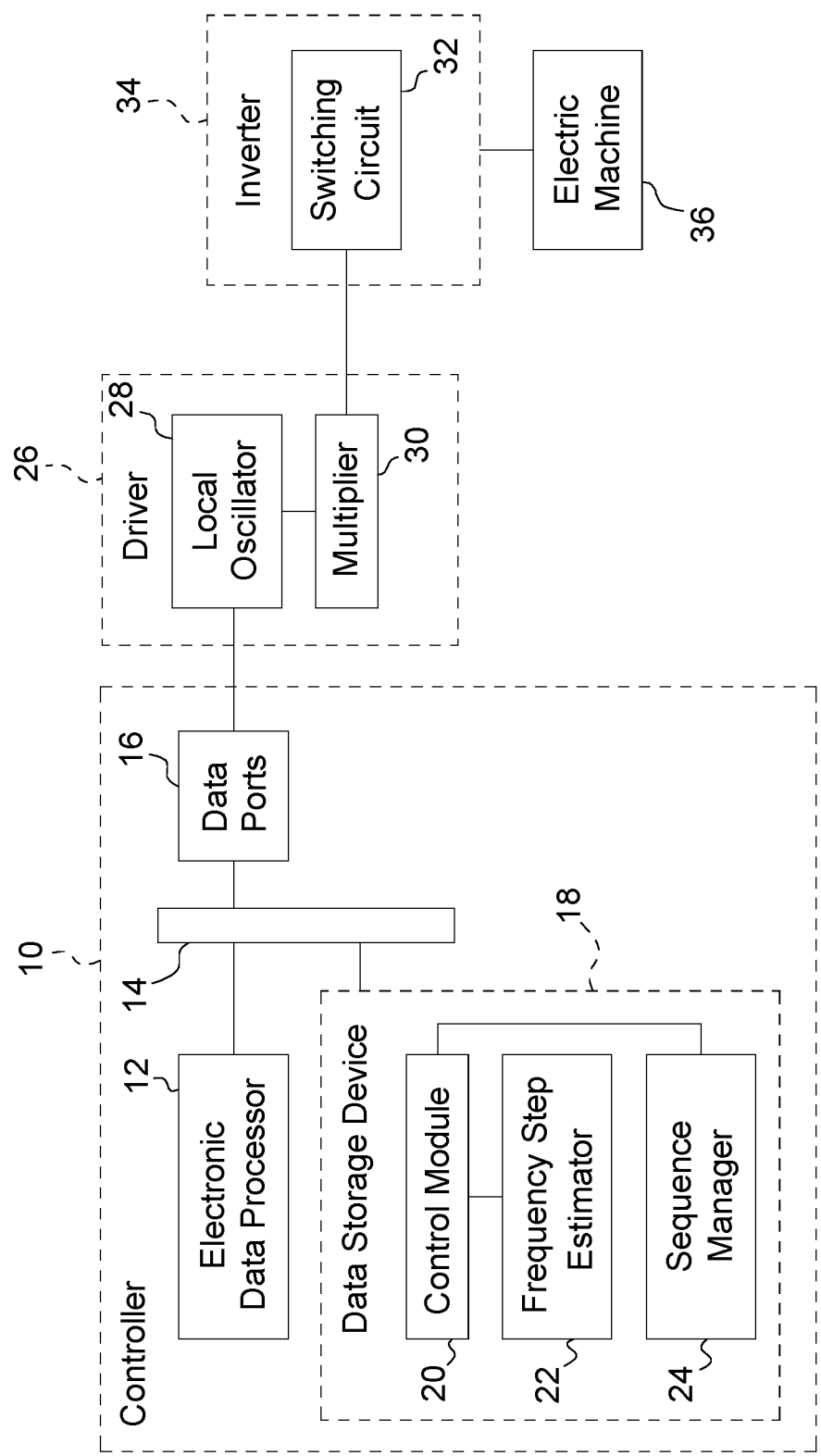
FIG. 1 is a block diagram of one embodiment for spread-spectrum control for an inverter for controlling an electric machine.

FIG. 1 is a block diagram of one embodiment for spread-spectrum control for an inverter 34 for controlling an electric machine 36. In accordance with FIG. 1, a controller 10 comprises an electronic data processor 12, a data storage device 18, and data ports 16 coupled to a data bus 14. The electronic data processor 12, the data storage device 18 and the data ports 16 may communicate data messages or signals with each other via the data bus 14.

The electronic data processor 12 may comprise a microcontroller, a microprocessor, a digital signal processor (DSP), an application specific integrated circuit (ASIC), a programming logic array, an arithmetic logic unit, a Boolean logic unit, a digital logic circuits, or the like.

In one embodiment, data storage device 18 may comprise electronic memory, non-volatile, random-access electronic memory, an magnetic storage device, an optical storage device, or another storage device for storing digital data, analog data, or both.

In one configuration, each data port 16 may comprise a data buffer, a data transceiver or another interface between the controller 10 and other electronic devices, network devices, sensors, circuitry or controllers.

The controller 10 comprises a data storage device 18 in communication with the electronic data processor 12. In one embodiment, one or more of the following modules or software instructions are stored in that data storage device 18: a control module 20, a frequency step estimator 22, and a sequence manager 24. For example, the control module 20 comprises software instructions for execution by the electronic data processor 12 to change dynamically the fundamental switching frequency 802 of the control signals to reduce electromagnetic noise within a target frequency band (or to distribute the electromagnetic noise outside of the target frequency band during one or more successive sampling intervals) if the fundamental switching frequency 802 is equal to or greater than a threshold fundamental switching frequency 802, where the switching frequency or sequence step may be changed once per sampling period or time interval.

In one embodiment, the control module 20 or frequency step estimator 22 may determine: (a) a magnitude or absolute value of any frequency step, and/or (b) a frequency difference between adjacent steps, different steps (e.g., with different values of sequence step number n) or changes to the fundamental switching frequency 802 of the control signals to reduce electromagnetic noise within a target frequency band, where the switching frequency or sequence step may be changed once per sampling period or time interval.

Figure 8:
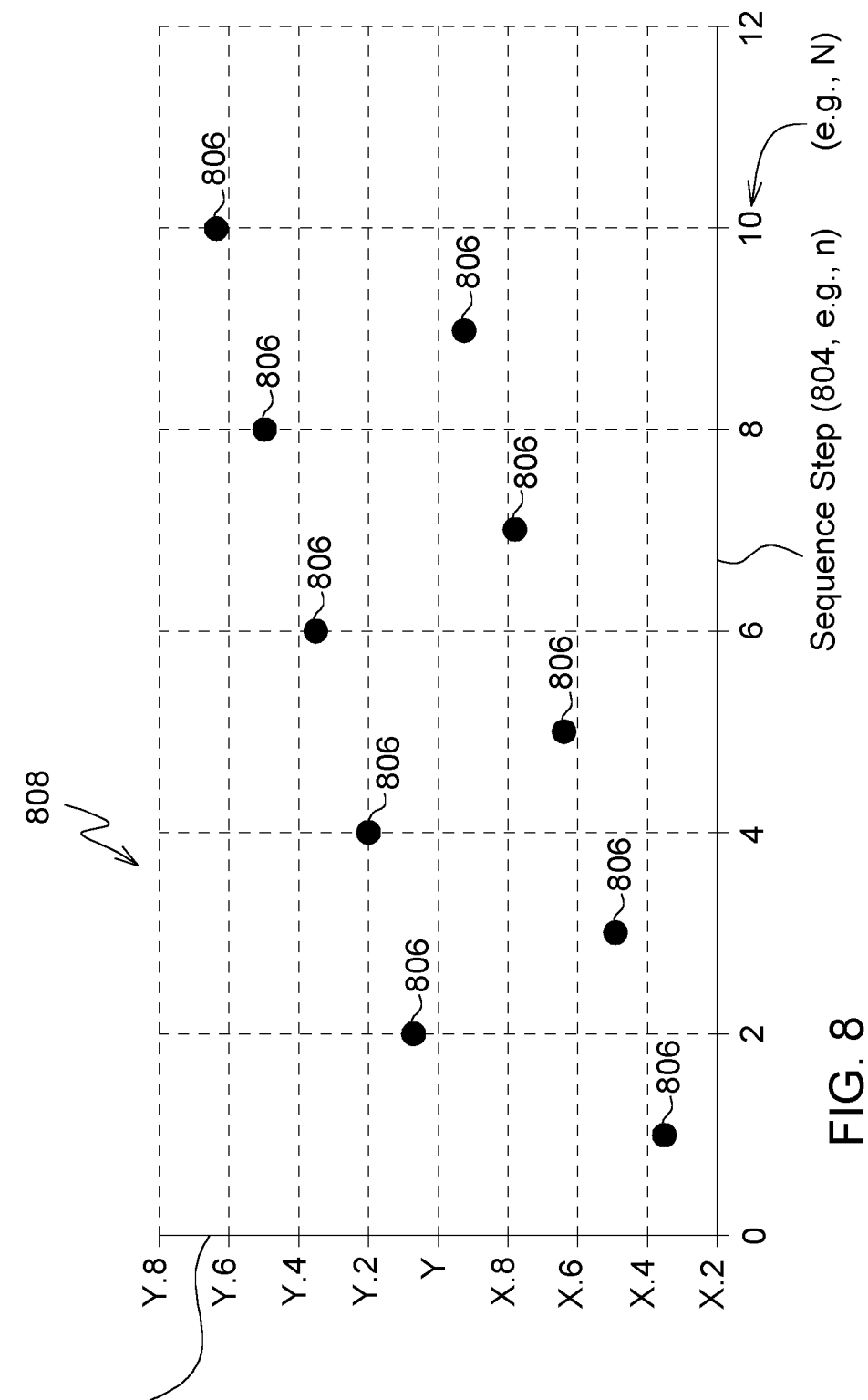
FIG. 8 is an illustrative graph of switching frequency versus sequence step (e.g., value of n) in accordance with spread-spectrum control for an inverter for controlling an electric machine.

In one configuration, the control module 20 or sequence manager 24 may comprise software instructions, a data structure (e.g., file, data records, database or look-up table), one or more equations, rules, if-then statements or logic to determine a sequence, pattern, permutation, order, or schedule of frequency steps, such as increases or decreases, from any initial step (e.g., n step) to any subsequent step (e.g., n+1 step) or frequency shift, where the switching frequency or sequence step may be changed once per sampling period or time interval. For example, as illustrated in FIG. 8, the control module 20 or sequence manager 24 increases the fundamental frequency for a transition from an odd-numbered step (e.g. n numbered step) to any adjacent even-numbered step, whereas the sequence manager 24 decreases the fundamental frequency for a transition from an even-numbered step (e.g. n numbered step) to any adjacent odd-numbered step.

However, in an alternate embodiment, the control module 20 or sequence manager 24 decreases the fundamental frequency for a transition from an odd-numbered step (e.g. n numbered step) to any adjacent even-numbered step, whereas the sequence manager 24 increases the fundamental frequency for a transition from an even-numbered step (e.g. n numbered step) to any adjacent odd-numbered step.

In FIG. 1, the driver 26 comprises an oscillator or local oscillator 28 that is associated with a frequency multiplier 30. An oscillator or local oscillator 28 is adapted to or configured to provide a local oscillator signal at local fundamental switching frequency 802, which can be defined as fixed or variable in frequency. A frequency multiplier 30 is coupled to the local oscillator 28, where the frequency multiplier 30 receives the local oscillator signal at the fundamental switching frequency 802. Accordingly, the driver 26 can produce or output an electromagnetic signal (to drive the inverter 34) at a fundamental frequency or at any integer multiple of the fundamental frequency in accordance with an integer multiplier coefficient setting or programming of the multiplier 30. In one configuration, a frequency multiplier parameter is configured to provide a multiplier parameter M to multiply the local oscillator signal at the fundamental switching frequency 802 to yield a next fundamental switching frequency 802 (e.g., multiplied fundamental switching frequency) in accordance with a fixed step, where M is any positive integer greater than or equal to 2.

In one embodiment, the control signals outputted by the driver 26, or its multiplier 30, comprise pulse-width modulated (PWM) signals in accordance with a target duty cycle for application to the inverter 34, or it switching circuit 32. In turn, the inverter 34 controls or provides one or more AC control signals to the electric machine 36 (e.g., in a motoring mode). Referring to FIG. 1, a driver 26 circuit is configured to provide control signals to the control terminals of the switching circuit 32, where the driver 26 circuit can operate at an operational fundamental switching frequency 802 of the control signals to reduce unwanted noise and interference with a targeted bandwidth or frequency range.

Figure 2:
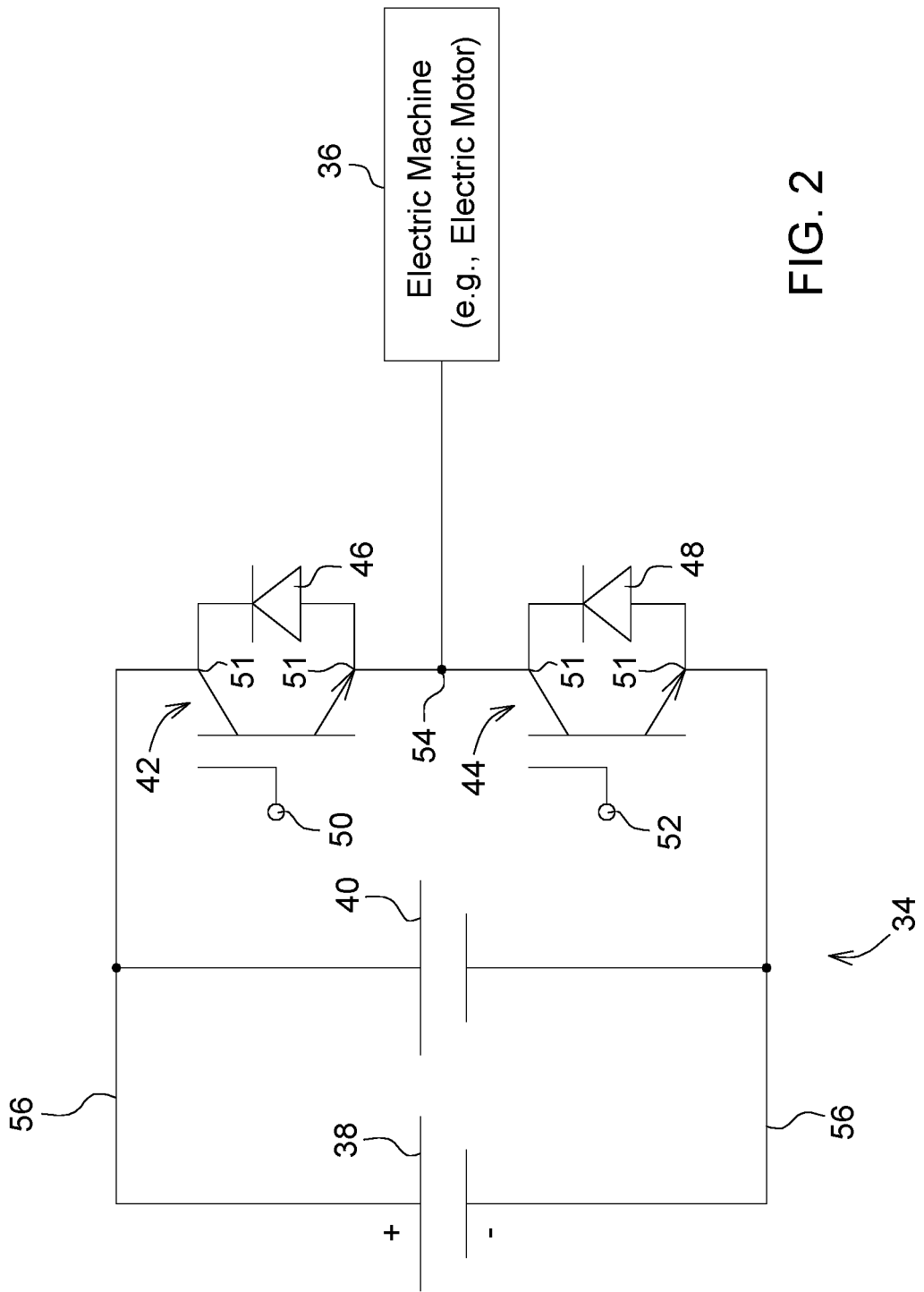
FIG. 2 is a schematic of one embodiment of a single-phase inverter for spread-spectrum control for an inverter for controlling an electric machine.

In accordance with one embodiment as illustrated in FIG. 1 in conjunction with FIG. 2, an inverter 34 for controlling an electric machine 36 comprises a switching circuit 32 that has a low-side switch 44 and a high-side switch 42. In FIG. 1 and FIG. 2 and in any other set of drawings, like reference numbers indicate like elements, steps or features.

In one embodiment, the low-side switch 44 and the high-side switch 42 each comprise a switching device, such as a transistor, an insulated-gate bipolar junction transistor, or field-effect transistor. The low-side switch 44 and the high-side switch 42 each have a control terminal (50, 52) and two switched terminals 51. For the low-side switch 44, the control terminal may be referred to as the low-side control terminal 52; for the high-side switch 42, the control terminal may be referred to as the high-side control terminal 50. One switched terminal 51 of the low-side switch 44 and one switched terminal 51 of the high-side switch 42 are coupled to the direct current (DC) bus 56, whereas opposite switched terminals of each switch are coupled together to form a phase output (node) 54 for an alternating current (AC) output signal. The DC bus 56 comprises DC terminals that are connected to an energy source 38, such as a battery, a generator output, or bank of capacitors. As illustrated, a capacitor 40 is coupled to the DC bus 56 for filtering ripple current in the DC bus 56. The AC output signal can be applied to or received from the electric machine 36.

In one example, as illustrated in FIG. 2, the switching circuit 32 comprises a single-phase switching circuit 32. In another example, the switching circuit 32 comprises a three-phase switching circuit 32. The inverter 34 is coupled to an electric machine 36 at one or more alternating current terminals of the electric machine 36.

FIG. 2 is a schematic of one embodiment of a single-phase, inverter 34 for spread-spectrum control of inverter 34 for controlling an electric machine 36. In FIG. 2, the switching circuit 32 comprises a low-side switch 44 and a high-side switch 42. The low-side switch 44 and the high-side switch 42 each have a control terminal (50, 52) and two switched terminals 51. Each control terminal (50, 52) comprises a base of an insulated gate, bipolar junction transistor or the gate of a field-effect transistor, for example. The driver 26 (of FIG. 1) is coupled to the control terminals (50, 52) of the respective switches (42, 44). Similarly, the switched terminals 51 comprise the emitter and collector of the insulated gate, bipolar transistor, or the source and drain of the field effect transistor, respectively.

As illustrated in FIG. 2, a diode (46, 48), such as a protection diode, is coupled in parallel to the switched terminals 51 to protect the corresponding switch (42, 44) from damage associated with transient switching signals when the low-side switch 44 and the high-side switch 42 change states between an inactive (e.g., off) state and an active (e.g., on) state. In one embodiment, a high-side protection diode 46 is coupled to the switched terminals 51 of a corresponding high-side switch (e.g., 42); the low-side protection diode 48 is coupled to the switched terminals 51 of a corresponding low-side switch (e.g., 44) (e.g., to dissipate unwanted electrical energy during transient switching events).

As shown, the emitter or switched terminal 51 of the high-side switch 42 is coupled to the collector or switched terminal 51 of the low-side switch 44 at an alternating-current (AC) terminal, such as an AC output terminal 54 of the inverter 34 operating in a motoring mode or motor control mode. The direct current (DC) bus 56, or DC terminals, are coupled between the collector or switched terminal 51 of the high-side switch 42 and the emitter or switched terminal 51 of the low-side switch 44, where an energy source 38 (e.g., DC energy source) and capacitor 40 are coupled in parallel to the DC bus 56 of the low-side switch 44 and the high-side switch 42. The capacitor 40 filters or smooths any ripple current or alternating current component in the DC voltage of the DC terminals.

Figure 3:
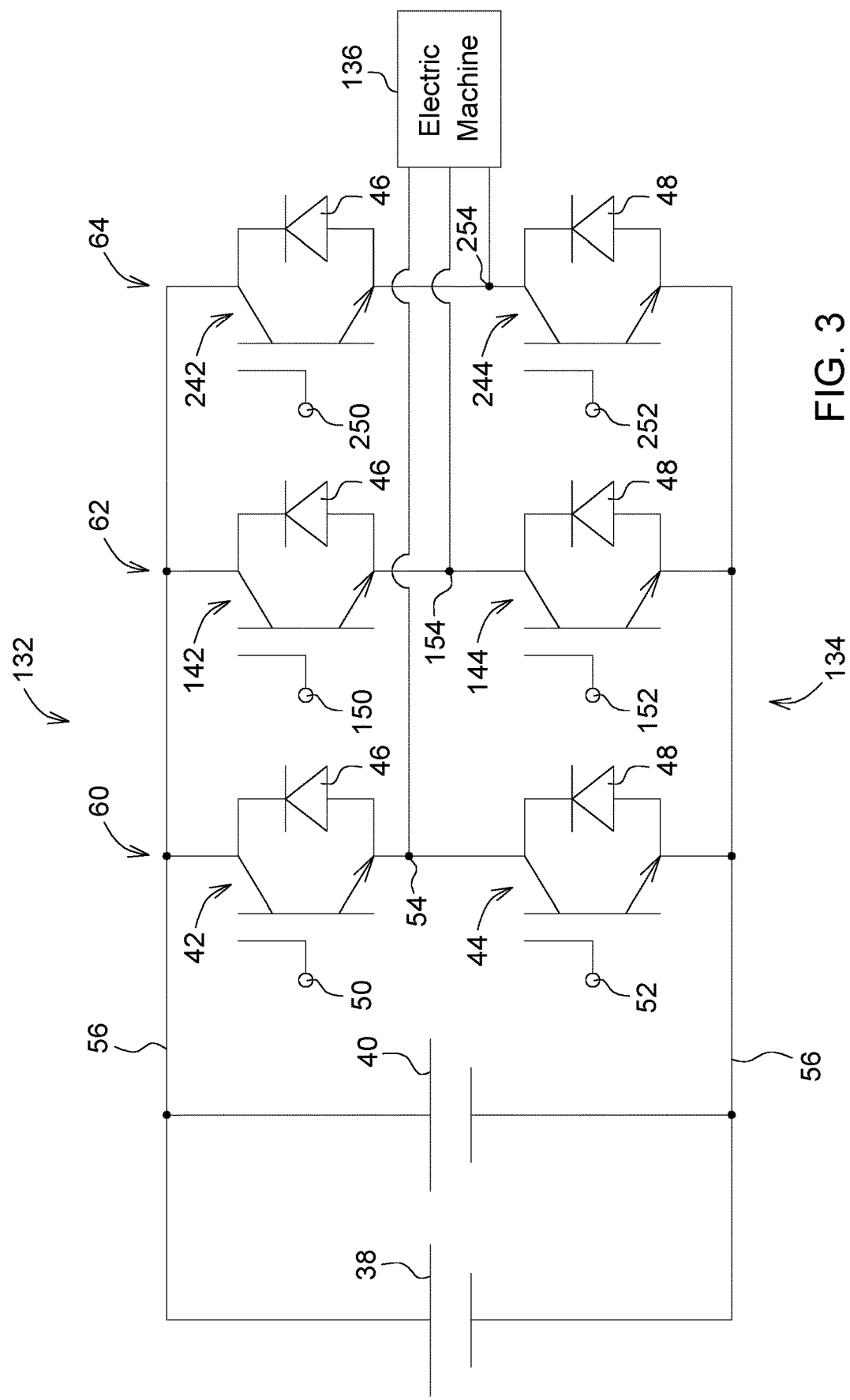
FIG. 3 is a schematic of one embodiment of a three-phase inverter for spread-spectrum control for an inverter for controlling an electric machine.

FIG. 3 is a schematic of one embodiment of a three-phase inverter 134 having spread-spectrum control of the inverter 134 to control an electric machine 136, such as a three-phase electric machine, with reduced harmonic frequency output. The switching circuit 132 of FIG. 3 is similar to the switching circuit 32 of FIGS. 1 and 2, except the switching circuit 132 of FIG. 3 is for a three-phase switching circuit, including a first phase 60, a second phase 62 and third phase 64. Each phase has a separate alternating current (AC) output terminal (54, 154, 254).

Each phase has a separate pair of a low-side switch (44, 144, 244) and a high-side switch (42, 142, 242). In a first phase 60, a first low-side switch 44 is coupled to a first high-side switch 42 at a first AC output terminal 54. In a second phase 62, a second low-side switch 144 is coupled to a second high-side switch 142 at a second AC output terminal 154. In a third phase 64, a third low-side switch 244 is coupled to a third high-side switch 242 at a third AC output terminal 254. The three-phase output terminals (54, 154, and 254) are coupled to an electric machine 136. For example, the electric machine 136 may comprise an electric motor, such a permanent magnet AC electric motor or an induction motor, in a motoring control mode. In an electrical energy generating mode, the electric machine 136 may comprise a generator or an alternator, for example.

Figure 4:
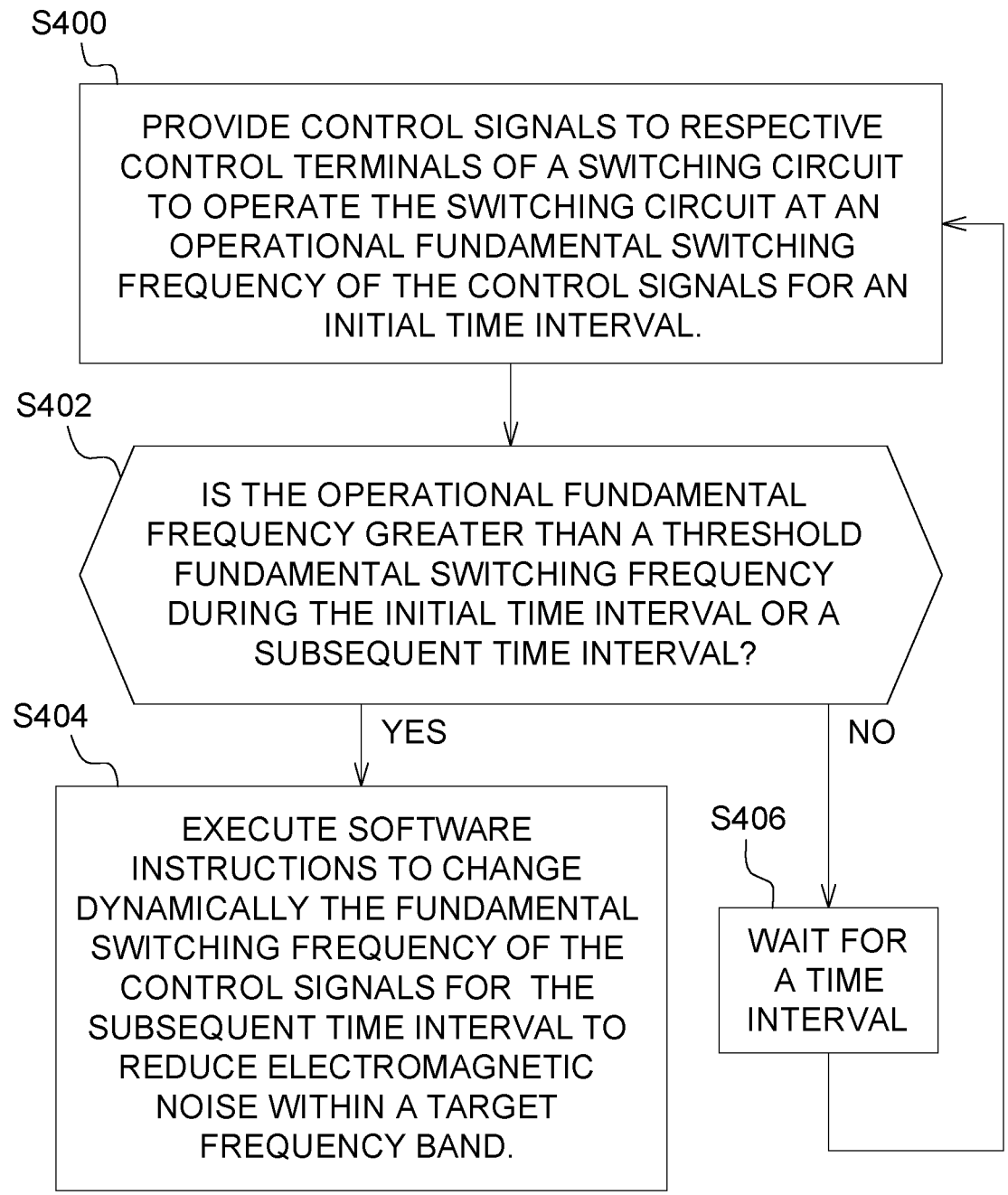
FIG. 4 is a flow chart of one embodiment of a method for spread-spectrum control for an inverter for controlling an electric machine.

FIG. 4 is a flow chart of one embodiment of a method for spread-spectrum control of an inverter (34, 134) for controlling an electric machine (36, 136). The inverter (34, 134) comprises a data storage device 18 capable of storing software instructions and an electronic data processor 12 in communication with the data storage device 18. The method of FIG. 4 starts in step S400.

In step S400, a controller 10, a driver 26, a local oscillator 28 or a multiplier 30, provides control signals to respective control terminals of a switching circuit (32, 132) to operate the switching circuit (32, 132) at a fundamental switching frequency 802 (e.g., operational fundamental switching frequency) of the control signals for an initial time interval. For example, the fundamental switching frequency may comprise an operational fundamental switching frequency that is consistent with one or more operational points, such as any operational points 806 illustrated in FIG. 8 in accordance with control data message or control signals provided by controller 10, acting by, via or through, the driver 26.

In step S402, the electronic data processor 12 or controller 10 determines whether, or not, the operational fundamental switching frequency (e.g., observed fundamental switching frequency) is greater than a threshold fundamental switching frequency 802 during the initial time interval or a subsequent time interval. If the electronic data processor 12 or controller 10 determines that the operational fundamental switching frequency (e.g., observed fundamental switching frequency) is greater than the threshold fundamental switching frequency 802 (e.g., during the initial time interval or a subsequent time interval), then the method continues with step S404. However, if the electronic data processor 12 or controller 10 determines that the operational fundamental switching frequency is not greater than (or, equivalently, is less than or equal to) the threshold fundamental switching frequency 802, then the method continues with step S406.

In an alternate embodiment of step S402, if the electronic data processor 12 or controller 10 determines that the operational fundamental switching frequency (e.g., observed fundamental switching frequency) is greater than or equal to the threshold fundamental switching frequency 802 (e.g., during the initial time interval or a subsequent time interval), then the method continues with step S404. Further in the alternate embodiment, if the electronic data processor 12 or controller 10 determines that the operational fundamental switching frequency is not greater than (or, equivalently, is less than) the threshold fundamental switching frequency 802, then the method continues with step S406.

In step S404, the electronic data processor 12, controller 10, or control module 20 executes software instructions to change dynamically the fundamental switching frequency 802 (e.g., next operational fundamental switching frequency) of the control signals or control message for the subsequent time interval to reduce electromagnetic noise within a target frequency band. For example, the electronic data processor 12 or controller 10 executes software instructions or one or more software modules (20, 22, 24) stored in the data storage device 18, to change dynamically the fundamental switching frequency 802 (e.g., next operational fundamental switching frequency) of the control signals for the subsequent time interval to reduce electromagnetic noise within a target frequency band if the fundamental switching frequency 802 (e.g., current operational fundamental switching frequency) is greater than the threshold fundamental switching frequency 802 during the initial time interval or a subsequent time interval. As used throughout this document, software modules or software instructions stored, retrieved, read, or accessed in the data storage device 18 may comprise one or more of the following: control module 20, frequency step estimator 22, and/or sequence manager 24.

Step S404 may be executed in accordance with various techniques, which may be applied separately or cumulatively.

Under a first technique, the software instructions comprise a spread-spectrum-control process or a frequency-hopping-control process to hop, step or change the fundamental switching frequency 802: (1) to reduce electromagnetic noise within a target bandwidth or target frequency range, and/or (2) to produce, mimic, or emulate white noise or Gaussian noise, rather than interference within the target bandwidth or target frequency range. For example, software instructions, the control module 20, the frequency step estimator 22, and/or the sequence manager 24 are configured to hop, step or change the fundamental switching frequency 802: (1) to reduce electromagnetic noise within a target bandwidth or target frequency range, and/or (2) to produce, mimic, or emulate white noise or Gaussian noise, rather than interference within the target bandwidth or target frequency range.

Here, the reduction of electromagnetic noise within a target bandwidth or target frequency range may relate configuring the controller 10, and its associated software modules, to control the inverter (34, 134) or switching circuit (32, 132) to manage the harmonic interference versus time that is produced by the inverter (34, 134) or switching circuit (32, 132), or to spread the harmonic interference versus time over an extended target bandwidth or target frequency range. For example, the target bandwidth or target frequency range is defined with respect to an acceptable electromagnetic noise level, an acceptable level of interfering electromagnetic signal, an acceptable level of harmonic distortion (e.g., acceptable level of total harmonic distortion), or an acceptable signal-strength-to-noise ratio of target signal with respect to the interfering signal or noise level. Harmonic interference or harmonic distortion means radio frequency interference or electromagnetic noise (e.g., nonlinear electromagnetic interference) that relates to the appearance of unwanted harmonics, such as integer multiples of a fundamental switching frequency or intermodulation products of a fundamental switching frequency and one or more harmonic components. Total harmonic distortion may be defined by firstly determining the square root of the sum of squares of harmonic signal level (e.g., voltage) in a set of harmonic components and secondly dividing the above determined square root of the sum of the squares by the fundamental signal level (e.g., voltage), or as otherwise defined by applicable standards and conventional practice, for instance. The inverter (34, 134) or switching circuit (32, 132) can produce harmonic interference and electromagnetic noise that may be subject to government regulations, limits, interference tests, lab tests, and certifications to avoid unwanted interference with other electronic devices, receivers, transmitters, or radio frequency or microwave equipment.

White noise has an random or flat magnitude versus frequency response (e.g., magnitude-frequency response) over the target bandwidth or target frequency range; Gaussian noise may have a magnitude-frequency response that approximates an ideal Gaussian response, which can be defined by as a normal distribution (e.g., bell-shaped curve) or normal probability density function of random signal measurements. Accordingly, some electronic devices (e.g., receivers or radios) may not notice, detect or suffer from interference in the presence of some white notice or Gaussian noise. In practice, white noise or Gaussian noise may be regulated less strictly or rigorously than harmonic interference or other types of electromagnetic noise.

Under a second technique, in accordance with a spread-spectrum control-process, software instructions, the control module 20, the frequency step estimator 22, and/or the sequence manager 24 are configured to change or step the fundamental switching frequency 802 by a fixed frequency step between a previous fundamental switching frequency (e.g., associated with a respective nth sequence step) and a next fundamental switching frequency (e.g., associated with respective nth+1 sequence step) based on the previous fundamental switching frequency (e.g., associated with a respective nth sequence step), a maximum dither percentage, and a ratio between the maximum dither percentage and a minimum dither percentage. Dither may refer to noise that is deliberately added to signal to reduce the noise, or to mimic or emulate white noise or Gaussian noise (e.g., that does not pose an interference problem to certain electronic devices). For example, dither may reduce the noise (e.g., digital or quantization noise) by reducing the correlation between the signal and the digital noise. As used in this document, dither is associated with, promotes, or fosters noise reduction or interference amelioration.

Under a third technique, in accordance with the spread-spectrum control-process, software instructions, the control module 20, the frequency step estimator 22, and/or the sequence manager 24 are configured to change or step the fundamental switching frequency 802 by a fixed frequency step between a previous fundamental switching frequency (e.g., associated with a respective nth sequence step) and a next fundamental switching frequency (e.g., associated with respective nth+1 sequence step) based on the previous fundamental frequency, a maximum dither percentage, and a total number of steps.

Under a fourth technique, software instructions, the control module 20, the frequency step estimator 22, and/or the sequence manager 24 is configured to determine a frequency step in the fundamental switching frequency 802 is determined in accordance with the following equations:

$$p_{max} = \frac{1}{1 + \text{ceiling}\left(\frac{f_{low}}{f_{switching}}\right)},$$

where $p_{max}$ is the maximum dither percentage, $f_{low}$ is a lowest frequency of concern (e.g., lowest target frequency) for electromagnetic interference; $f_{switching}$ is the operational switching frequency 802 (e.g., fundamental switching frequency) of the switching circuit (32, 132); and where the above ceiling function rounds up the ratio of $f_{low}/f_{switching}$ to a nearest or next highest positive integer value;

$$p_{min} = \frac{RBW}{2 * \text{ceiling}\left(\frac{f_{low}}{f_{switching}}\right) * f_{switching}},$$

where RBW is a resolution bandwidth (e.g., target bandwidth) of a receiving device for monitoring electromagnetic interference, $f_{low}$ is a lowest frequency of concern (e.g., lowest target frequency) for electromagnetic interference; $f_{switching}$ is the operational switching frequency 802 (e.g., fundamental switching frequency) of the switching circuit (32, 132); and where the above ceiling function rounds up the ratio of $f_{low}/f_{switching}$ to a nearest or next highest positive integer value;

$$N = 2 * \text{ceiling}\left(\frac{p_{max}}{p_{min}}\right),$$

where N is the total number of n sequence steps; n is a positive integer or whole number greater than or equal to 2; $p_{max}$ is the maximum dither percentage, $p_{min}$ is a minimum dither percentage; and the ceiling refers to a ceiling function or function in which the ratio of $p_{max}/p_{min}$ is rounded up to a nearest or next highest positive integer value.

Under a fifth technique, in accordance with the spread-spectrum control-process a data storage device 18 or controller 10 stores or comprises a look-up table, inverted file, data base, or other data structure that provides the fixed step in the fundamental frequency based on the previous fundamental frequency, the maximum dither percentage, and the total number of steps. For example, the software instructions, the control module 20, the frequency step estimator 22, and/or the sequence manager 24 is configured to store a look-up table, inverted file, data base, or other data structure that provides the fixed step or next step in the fundamental switching frequency (e.g., associated with respective nth+1 sequence step) based on the previous fundamental switching frequency (e.g., associated with a respective nth sequence step), the maximum dither percentage, and the total number of steps.

Under a sixth technique, in accordance with one embodiment, software instructions, the control module 20, the frequency step estimator 22, and/or the sequence manager 24 is configured to determine the step size or target frequency adjustment of each frequency step in accordance with the following equation:

$$f_{step} = \frac{f_{switching} * 2p_{max}}{N},$$

where $f_{step}$ is a minimum step size between the previous switching frequency 802 (e.g., associated with a respective nth sequence step) and the next switching frequency 802 (e.g., associated with respective nth+1 sequence step) for any step in a stepping sequence; $f_{switching}$ is the operational switching frequency 802 (e.g., fundamental switching frequency) of the switching circuit (32, 132); $p_{max}$ is the maximum dither percentage; N is the total number of n steps in the stepping sequence; n is a positive integer or whole number greater than or equal to 2.

Under a seventh technique, a software instructions, the control module 20, the frequency step estimator 22, and/or the sequence manager 24 is configured to provide, to manage, to read, or to retrieve and store any look-up table, inverted file, data base, or other data structure to facilitate transitions between or among a set, sequence, permutation, or order of fixed or defined frequency steps (or one or more operational points 806) that can be transitioned to in the sequence of the operational fundamental frequencies as follows:

$$D(n) = \begin{cases} f_{1+\frac{n-1}{2}} & \text{if } n \text{ is odd} \\ f_{\frac{n}{2}+\frac{Number\ of\ steps}{2}} & \text{if } n \text{ is even} \end{cases}$$

$$f_n = f_{switching} + f_{step} * \left(n - \frac{N+1}{2}\right),$$

where D(n) is the dithering function that determines a next fundamental frequency (e.g., associated with respective nth+1 sequence step) in a sequence of fundamental frequencies from a first fundamental frequency at n equals 1 to an Nth fundamental frequency at n equals N, where n equals any positive integer (or whole number) within the range from 1 to N, $f_{step}$ is the minimum step size between the previous switching frequency 802 (e.g., associated with a respective nth sequence step) and the next switching frequency 802 (e.g., associated with respective nth+1 sequence step) for any nth step, $f_n$, within the ascending cycle or sequence of steps between the sequence first step, $f_1$, and the sequence terminal step, $f_N$; $f_{switching}$ is the operational switching frequency 802 of the switching circuit 32 comprising a local oscillator frequency (of local oscillator 28); and N is the total number of steps in the sequence.

Under an eighth technique, a software instructions, the control module 20, the frequency step estimator 22, and/or the sequence manager 24 is configured to control, direct or manage an average increase in the fundamental switching frequency (or frequencies) above a reference fundamental switching frequency that contributes toward a reduction of a duration of the input signal to the switching circuit (e.g., control terminal(s) of any low-side, high-side switch, or combination of low-side and high-side switches of one or more phases), an increased slope of the magnitude versus time slope of the input signal to the switching circuit and a reduction of transient short circuit power dissipation of the switching circuit. For example, as used throughout this document, the average increase in the fundamental switching frequency above a reference fundamental switching frequency may comprise an geometric average (e.g., mean), a time weighted average (e.g., mean), a mean, a mode, or median of the distribution of the fundamental switching frequencies over one or more rotations, cycles, or sequences (e.g., where a complete cycle may represent the transitions in fundamental switching frequencies from n equal 1 to N over multiple time intervals.)

In step S406, the electronic data processor 12 or controller 10 waits for a time interval; upon expiration of the time interval, the method continues with or returns to step S400.

Figure 5:
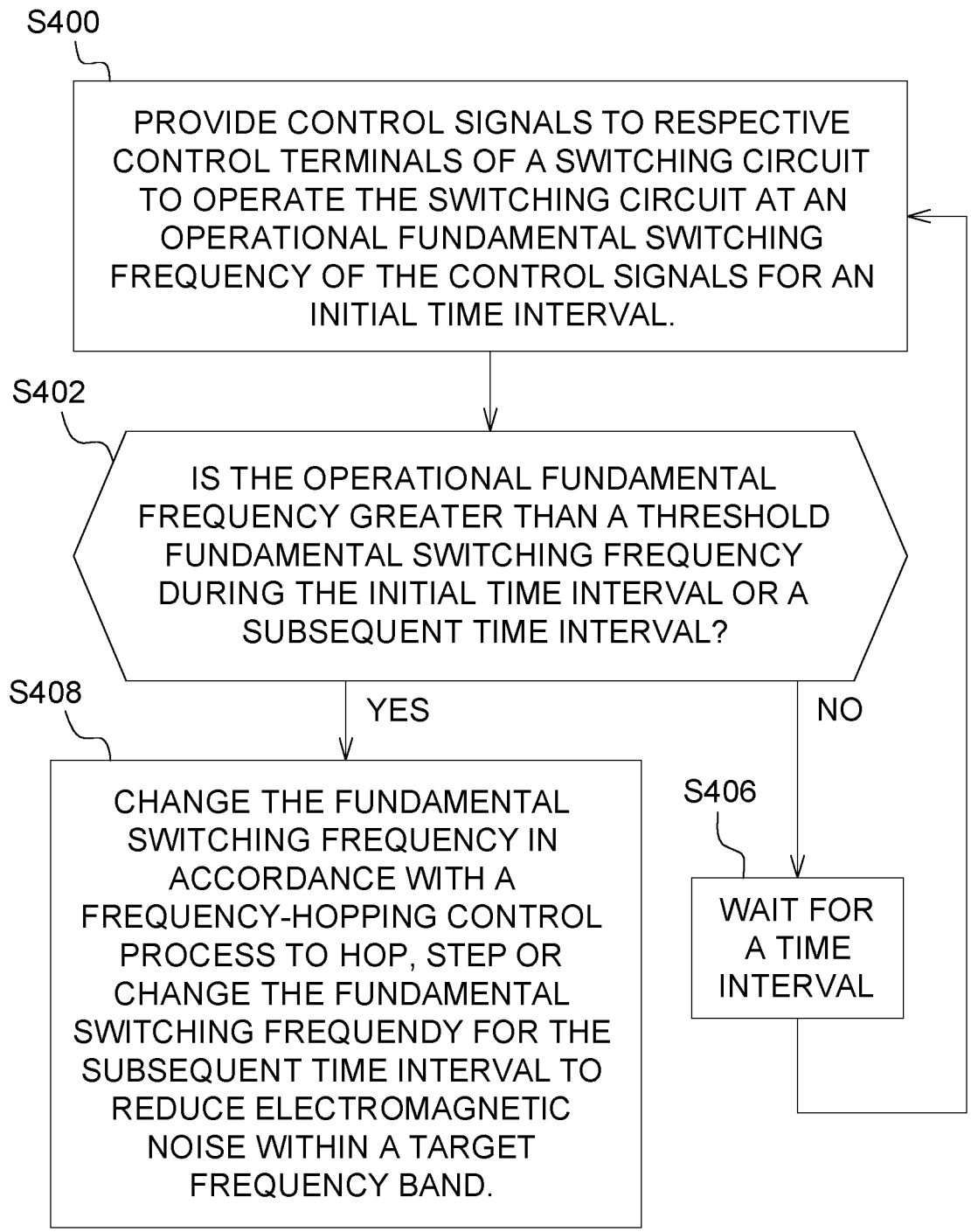
FIG. 5 is a flow chart of another embodiment of a method for spread-spectrum control for an inverter for controlling an electric machine.

FIG. 5 is a flow chart of one embodiment of a method for spread-spectrum control for an inverter (34, 134) for controlling an electric machine 36. The method of FIG. 5 is similar to the method of FIG. 4, except step S404 is replaced with step S408. Like reference numbers in FIG. 4 and FIG. 5 indicate like steps or procedures.

In step S408, the electronic data processor 12 or controller 10 changes the fundamental switching frequency 802 in accordance with a frequency-hopping-control process to hop, step, change, or adjust the fundamental switching frequency 802 for the subsequent time interval to reduce electromagnetic noise within a target frequency band. For example, software instructions, the control module 20, the frequency step estimator 22, and/or the sequence manager 24 is configured to changes the fundamental switching frequency 802 in accordance with a frequency-hopping-control process to hop, step, change, or adjust the fundamental switching frequency 802 for the subsequent time interval to reduce electromagnetic noise within a target frequency band, or to mimic or emulate white noise or Gaussian noise within the target frequency band, or at a lowest target frequency associated with the target frequency band. As used in this document, references to a target frequency band may be defined by a lowest target frequency or frequency of concern of the target frequency band, by a highest target frequency or frequency of concern of the target frequency band, or both.

Figure 6:
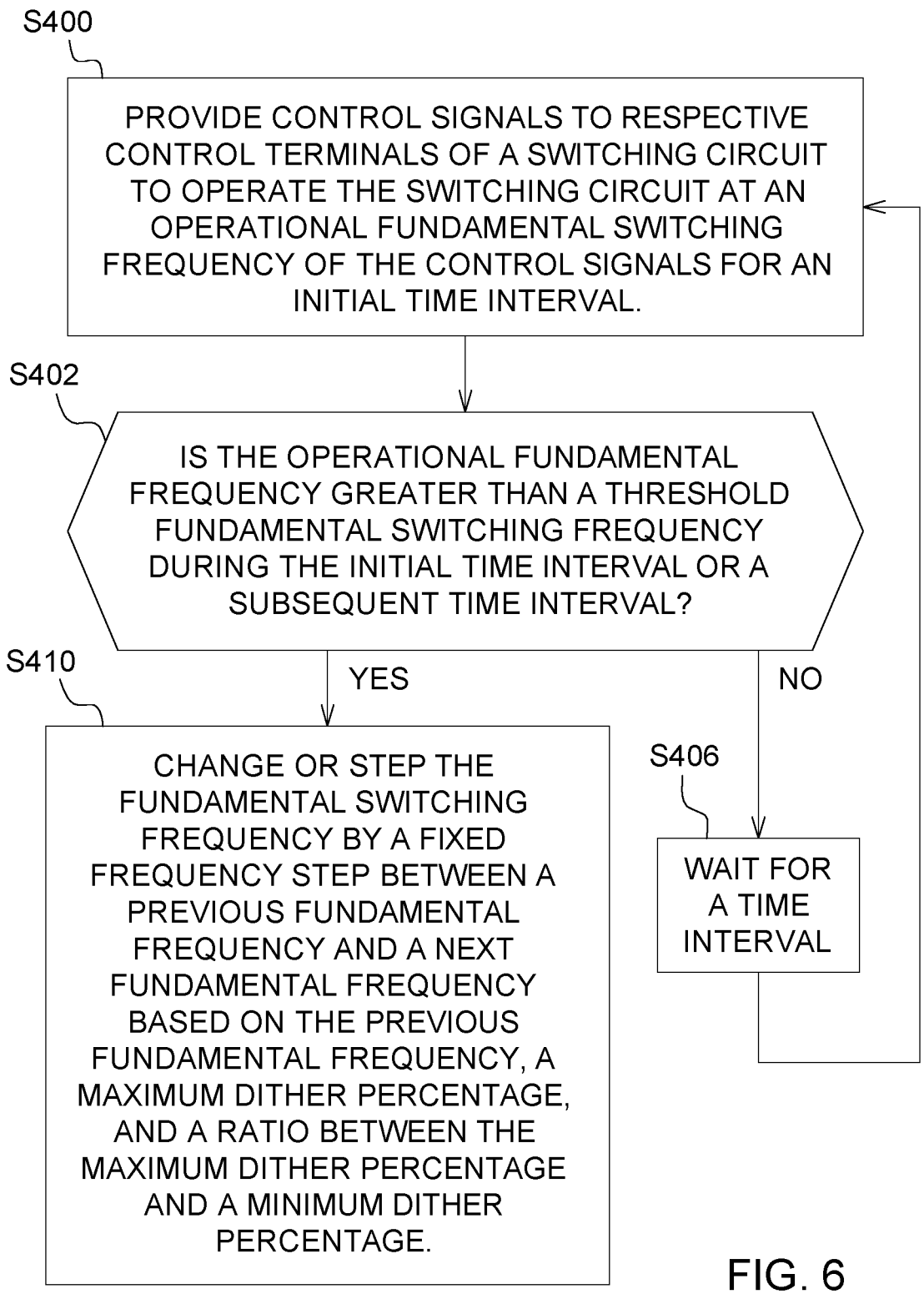
FIG. 6 is a flow chart of yet another embodiment of a method for spread-spectrum control for an inverter for controlling an electric machine.

FIG. 6 is a flow chart of one embodiment of a method for spread-spectrum control for an inverter 34 for controlling an electric machine 36. The method of FIG. 6 is similar to the method of FIG. 4, except step S404 is replaced with step S410. Like reference numbers in FIG. 4 and FIG. 6 indicate like steps or procedures.

In step S410, the electronic data processor 12 or controller 10 changes the fundamental switching frequency 802 by a fixed frequency step or a defined frequency step (e.g., increment or decrement) between a previous fundamental frequency (e.g., associated with a respective nth sequence step) and a next fundamental frequency (e.g., associated with respective nth+1 sequence step) based on the previous fundamental frequency, a maximum dither percentage, and a ratio between the maximum dither percentage and minimum dither percentage. For example, software instructions, the control module 20, the frequency step estimator 22, and/or the sequence manager 24 is configured to change or step the fundamental switching frequency 802 by a fixed frequency step or defined frequency step (e.g., increment or decrement) between a previous fundamental frequency (e.g., associated with a respective nth sequence step) and a next fundamental frequency (e.g., associated with respective nth+1 sequence step) based on the previous fundamental frequency, a maximum dither percentage, and a ratio between the maximum dither percentage and minimum dither percentage: (1) to reduce electromagnetic noise within a target frequency band, and/or (2) to mimic or emulate white noise or Gaussian noise within the target frequency band, or at a lowest target frequency associated with the target frequency band. As used in this document, references to a target frequency band may be defined by a lowest target frequency or frequency of concern of the target frequency band, by a highest target frequency or frequency of concern of the target frequency band, or both.

Figure 7:
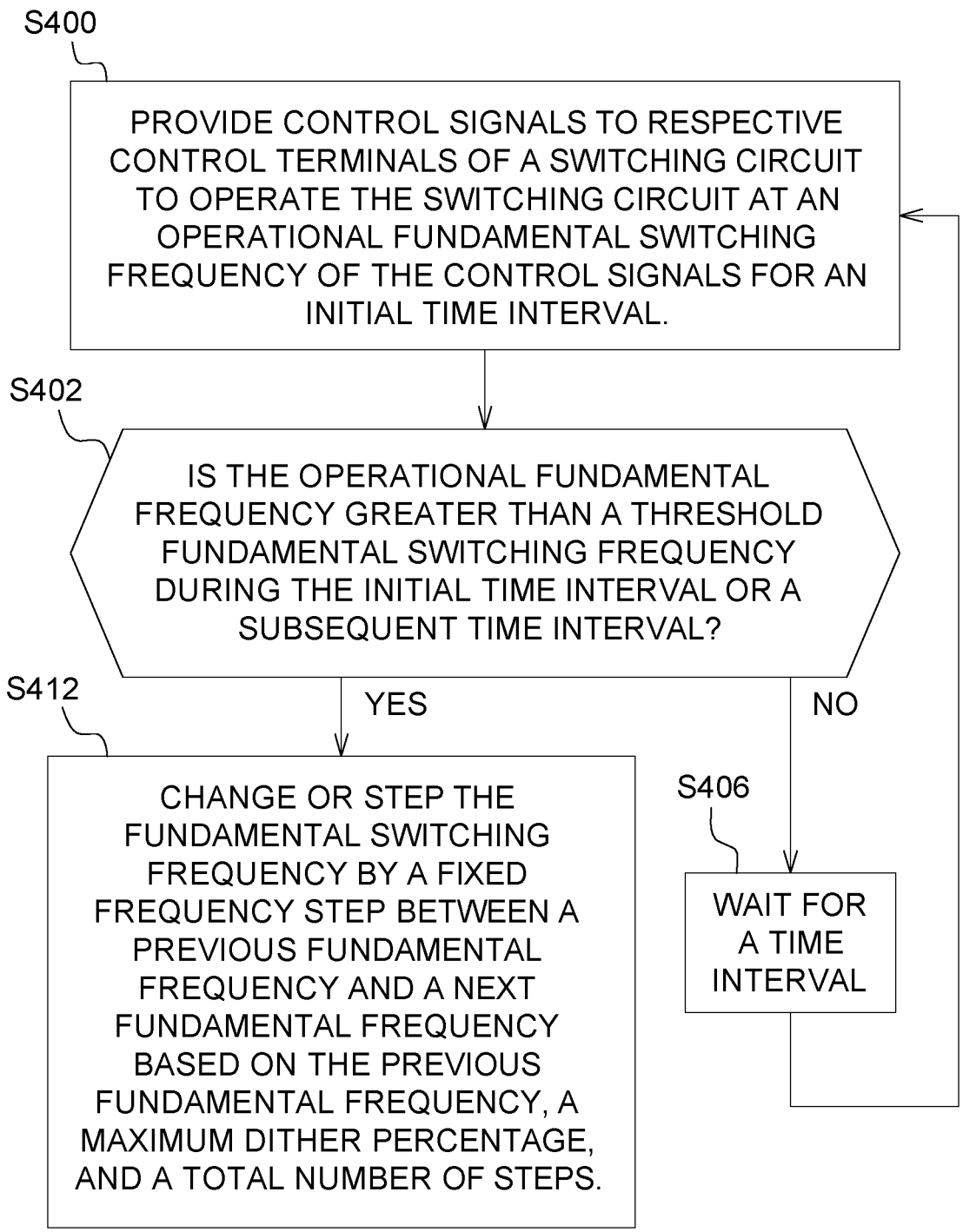
FIG. 7 is a flow chart of still another embodiment of a method for spread-spectrum control for an inverter for controlling an electric machine.

FIG. 6 is a flow chart of one embodiment of a method for spread-spectrum control for an inverter 34 for controlling an electric machine 36. The method of FIG. 7 is similar to the method of FIG. 4, except step S404 is replaced with step S412. Like reference numbers in FIG. 4 and FIG. 7 indicate like steps or procedures.

In step S412, the electronic data processor 12 or controller 10 changes, steps, shifts, increments or decrements the fundamental switching frequency 802 by a fixed frequency step between a previous fundamental frequency (e.g., associated with a respective nth sequence step) and a next fundamental frequency (e.g., associated with respective nth+1 sequence step) based on the previous fundamental frequency, a maximum dither percentage, and a total number of steps (N). For example, software instructions, the control module 20, the frequency step estimator 22, and/or the sequence manager 24 is configured to change, shift, increment, decrement or to step the fundamental switching frequency 802 by a fixed frequency step between a previous fundamental frequency (e.g., associated with a respective nth sequence step) and a next fundamental frequency (e.g., associated with respective nth+1 sequence step) based on the previous fundamental frequency, a maximum dither percentage, and a total number of steps (N) (e.g., consistent with one or more operating points or operational points 806.)

FIG. 8 is an illustrative graph of frequency versus sequence step 804 or value of n in accordance with spread-spectrum control for an inverter 34 for controlling an electric machine (36, 136). In FIG. 8, the vertical axis represents switching frequency 802 of the inverter 34, such as frequency in kilohertz (KHz), whereas the horizontal axis represents the sequence step 804 or value of n. The switching frequency 802 of the inverter is synonymously referred to as the fundamental frequency or fundamental switching frequency, which means that the switching frequency 802 is commanded by the driver (26, 126), as opposed to unwanted harmonic frequencies that may comprise an integer multiple of the fundamental frequency or switching frequency. In practice, the fundamental switching frequency may be limited by the maximum switching frequency (e.g., $f_{max}$) of the switches (e.g., transistors) in the switching circuit 32, such as the low-side switch 44 and the high-side switch 42, where the maximum switching frequency may be decreased by a design factor (e.g., divisor of 4 to 12) to produce an alternating current output signal with acceptable or target distortion level (e.g., target total harmonic distortion). As illustrated in FIG. 8, the switching frequency lists Y and X, where X and Y are positive integers (e.g., expressed in KHz), and where Y=X+1. T For example, if X equals 24 KHz, then would equal 25 KHz; if X equals 19 KHz than Y would equal 20 KHz. In general, notwithstanding any examples presented in this document, the switching frequencies may range from approximately 1 KHz to approximately 200 KHz or greater.

In one embodiment, controller 10, acting by, through or via the driver (26, 126), drives or controls the inverter 34 to operate at a series of operating points 806 that are defined by a corresponding combination (e.g., permutation) of a sequence step 804 and a respective switching frequency 802, where the sequence step 804 can vary n, from n equals 1 to n equals N, where N is a positive integer greater than or equal to two.

As illustrated in FIG. 8, even values of n increase linearly in frequency with corresponding increase in the sequence number n. Similarly, odd values of n increase linearly in frequency with corresponding increase in the sequence number n. However, if all values of n are considered collectively, the aggregate increase in frequency takes on saw-tooth variation 808 (e.g., composed of alternating increments and decrements in switching frequency as determined by the equations referenced in conjunction with the method of FIG. 4) that generally increases with increasing sequence step 804, along with some local decrease in frequency for every other sequence step. For example, as illustrated in FIG. 8, the sequence manager 24 increases (e.g., increments) the fundamental frequency for a transition from an odd-numbered step (e.g., n numbered step) to any adjacent even-numbered step, whereas the sequence manager 24 decreases (e.g., decrements) the fundamental frequency for a transition from an even-numbered step (e.g. n numbered step) to any adjacent odd-numbered step.

However, in an alternate embodiment, the sequence manager 24 decreases (e.g., decrements) the switching frequency 802 for a transition from an odd-numbered step (e.g. n numbered step) to any adjacent even-numbered step, whereas the sequence manager 24 increases (e.g., increments) the switching frequency 802 or fundamental frequency for a transition from an even-numbered step (e.g. n numbered step) to any adjacent odd-numbered step.

Although FIG. 8 illustrates the sequence step 804 of steps from n equals 1 to n (e.g., N) equals 10, in practice the dithering function may be used to select the switching frequency 802 that corresponds to the value of n that this then selected or next selected by the dithering function. Further in some alternate configurations, the values of n may be selected randomly in accordance with the dithering function.

The inverter power rating is typically limited by the overall power dissipation of the switches (42, 142, 242, 44, 144, 244), where the power dissipation is attributed to switching losses, conduction losses, and quiescent losses. For example, dynamic semiconductor switching losses may be associated with transient short-circuit state of a pair of switches (of any inverter phase) and capacitive loads at the output terminal of the switch. If the input signal to the control terminal (50, 150, 250, 52, 152, 252) of the switch has a slope (e.g., of input signal magnitude versus time), the switched terminals 51 of the pair of switches (of any phase of the inverter) may simultaneously conduct for a transient short-circuit state, which results in increased power dissipation. In one embodiment, the spread-spectrum control method and system facilitates potentially lower switching losses, where overall or on the average at least some of the switching transitions of the switches (42, 142, 242, 44, 144, 244), or pairs of switches, can be accomplished more quickly, consistent with rotation through a sequence of fundamental switching frequencies that include some higher fundamental switching frequencies in the sequence. The switching transitions can be accomplished more quickly by any of the following: (1) a shorter duration of input signal than a reference duration of a reference input signal, (2) a steeper rising edge of input signal than a reference rising edge of a reference input signal, or (3) a steeper magnitude (current) versus time slopes of the input signal than the reference magnitude versus time slope of some reference input signal.

In one configuration, separately or cumulatively with any steps set forth in the methods of FIG. 4 through FIG. 6, inclusive, the data processor 12 or sequence manager 24 is configured to increase (or an average increase in a sequence, cycle, rotation or series of sequence steps) in the fundamental switching frequencies above a reference fundamental frequency that tends to or contributes to any of the following: to reduce the duration of the input signal at any control terminals (50, 150, 250, 52, 152, 252) of the switches, to increase the slope of the magnitude versus time slope of the input signal at any control terminals (50, 150, 250, 52, 152, 252), and to reduce transient short circuit power dissipation, subject to any lesser offset from capacitive losses associated with the output terminal (e.g., filters, matching network or input impedance of alternating current (AC) terminals of the electric machine 36, 136) that can potentially increase with increasing switching frequency.

In one embodiment, separately or cumulatively with any steps set forth in the methods of FIG. 4 through FIG. 6, inclusive, software instructions, the control module 20, the frequency step estimator 22, and/or the sequence manager 24 is configured to control, direct or manage an average increase in the fundamental switching frequency (or frequencies) above a reference fundamental switching frequency that contributes toward a reduction of a duration of the input signal to the switching circuit (e.g., control terminal(s) of any low-side, high-side switch, or combination of low-side and high-side switches of one or more phases), an increased slope of the magnitude versus time slope of the input signal to the switching circuit and a reduction of transient short circuit power dissipation of the switching circuit. For example, as used throughout this document, the average increase in the fundamental switching frequency above a reference fundamental switching frequency may comprise an geometric average (e.g., mean), a time weighted average (e.g., mean), a mean, a mode, or median of the distribution of the fundamental switching frequencies over one or more rotations, cycles, or sequences (e.g., where a complete cycle may represent the transitions in fundamental switching frequencies from n equal 1 to N over multiple time intervals.)

This document describes various illustrative embodiments which can be varied in many ways. Such variations are not to be regarded as a departure from the spirit and scope of illustrative embodiments, and all such variations or modifications as would be obvious to one skilled in the art are intended to be included within the scope of the claims.

The following is claimed:

1. An inverter for controlling an electric machine, the inverter comprising:
    a switching circuit comprising a low-side switch and a high-side switch, the low-side switch and the high-side switching each having a control terminal and two switched terminals;
    a driver circuit for providing control signals to the control terminals of the switching circuit, the driver circuit operating at an operational fundamental switching frequency of the control signals;
    an electronic data processor;
    a data storage device in communication with the electronic data processor;
    a control module stored in the data storage device, the control module comprising software instructions for execution by the electronic data processor to change dynamically the fundamental switching frequency of the control signals to reduce electromagnetic noise within a target frequency band if the fundamental switching frequency is equal to or greater than a threshold fundamental switching frequency, wherein the software instructions comprise a spread-spectrum-control process or frequency-hopping control process to hop, step or change the fundamental switching frequency and wherein the control module is configured to change or step the fundamental switching frequency by a fixed frequency step between a previous fundamental frequency and a next fundamental frequency based on the previous fundamental frequency, a maximum dither percentage, and a ratio between the maximum dither percentage and a minimum dither percentage.

2. An inverter for controlling an electric machine, the inverter comprising:
    a switching circuit comprising a low-side switch and a high-side switch, the low-side switch and the high-side switching each having a control terminal and two switched terminals;
    a driver circuit for providing control signals to the control terminals of the switching circuit, the driver circuit operating at an operational fundamental switching frequency of the control signals;
    an electronic data processor;
    a data storage device in communication with the electronic data processor;
    a control module stored in the data storage device, the control module comprising software instructions for execution by the electronic data processor to change dynamically the fundamental switching frequency of the control signals to reduce electromagnetic noise within a target frequency band if the fundamental switching frequency is equal to or greater than a threshold fundamental switching frequency, wherein the software instructions comprise a spread-spectrum-control process or frequency-hopping control process to hop, step or change the fundamental switching frequency and wherein, in accordance with the spread-spectrum control-process, the control module is configured to change or step the fundamental switching frequency by a fixed frequency step between a previous fundamental frequency and a next fundamental frequency based on the previous fundamental frequency, a maximum dither percentage, and a total number of steps.

3. The inverter according to claim 2 wherein the step in the fundamental switching frequency is determined in accordance with the following equations:

$$p_{max} = \frac{1}{1 + \text{ceiling}\left(\frac{f_{low}}{f_{switching}}\right)},$$

where $p_{max}$ is the maximum dither percentage, $f_{low}$ is a lowest frequency of concern for electromagnetic interference; switching is the operational switching frequency of the switching circuit; and where the above ceiling function rounds up the ratio $f_{low}/f_{switching}$ to a nearest or next highest positive integer value;

$$p_{min} = \frac{RBW}{2 * \text{ceiling}\left(\frac{f_{low}}{f_{switching}}\right) * f_{switching}},$$

where RBW is a resolution bandwidth of a receiving device for monitoring electromagnetic interference, $f_{low}$ is the lowest frequency of concern for electromagnetic interference; $f_{switching}$ is the operational switching frequency of the switching circuit; and where the above ceiling function rounds up the ratio of $f_{low}/f_{switching}$ to a nearest or next highest positive integer value;

$$N = 2 * \text{ceiling}\left(\frac{p_{max}}{p_{min}}\right),$$

where N is the total number of steps, $p_{max}$ is the maximum dither percentage, $p_{min}$ is a minimum dither percentage, and the ceiling refers to a ceiling function or function in which the ratio of $p_{max}/p_{min}$ In is rounded up to a nearest or next highest positive integer value.

4. The inverter according to claim 2 wherein, in accordance with the spread-spectrum control-process comprises a look-up table, inverted file, data base, or other data structure that provides the fixed frequency step in the fundamental frequency based on the previous fundamental frequency, the maximum dither percentage, and the total number of steps.

5. The inverter according to claim 3 wherein the step size or target frequency adjustment of each frequency step is determined in accordance with the following equation:

$$f_{step} = \frac{f_{switching} * 2p_{max}}{N},$$

where $f_{step}$ is a minimum step size between the previous switching frequency and the next switching frequency for any step in a stepping sequence; $f_{switching}$ is the operational switching frequency of the switching circuit; $p_{max}$ is the maximum dither percentage; and N is the total number of steps in the stepping sequence.

6. The inverter according to claim 5 wherein a look-up table, inverted file, data base, or other data structure that provides a set of fixed frequency steps that can be transitioned to in the sequence of the operational fundamental frequencies as follows:

$$D(n) = \begin{cases} f_{1+\frac{n-1}{2}} & \text{if } n \text{ is odd} \\ f_{\frac{n}{2}+\frac{\text{Number of steps}}{2}} & \text{if } n \text{ is even} \end{cases}$$

$$f_n = f_{switching} + f_{step} * \left(n - \frac{N+1}{2}\right),$$

where D(n) is the dithering function that determines a next fundamental frequency in a sequence of fundamental frequencies from a first fundamental frequency at n equals 1 to an Nth fundamental frequency at n equals N, where n equals any positive integer within the range from 1 to N, $f_{step}$ is the minimum step size between the previous switching frequency and the next switching frequency for any nth step, $f_n$, within the ascending cycle or sequence of steps between the sequence first step, $f_1$, and the sequence terminal step, $f_N$; $f_{switching}$ is the operational switching frequency of the switching circuit comprising a local oscillator frequency; and N is the total number of steps in the sequence.

7. The inverter according to claim 1 further comprising:
an oscillator providing a local oscillator signal at a fixed or local fundamental switching frequency;
a frequency multiplier coupled to the oscillator, the frequency multiplier receiving the local oscillator signal at the fundamental switching frequency;
a frequency multiplier parameter for providing a multiplier M to multiply the local oscillator signal at the fundamental switching frequency to yield the next fundamental switching frequency in accordance with the fixed frequency step, where M is any positive integer greater than or equal to 2.

8. The inverter according to claim 1 wherein the control signals comprise pulse-width modulated (PWM) signals in accordance with a target duty cycle.

9. A method for controlling an inverter for an electric machine, the inverter comprising a data storage device capable of storing software instructions and an electronic data processor in communication with the data storage device, the method comprising:
providing a plurality of control signals to respective control terminals of a switching circuit to operate the switching circuit at an operational fundamental switching frequency of the control signals for an initial time interval;
determining if the operational fundamental frequency is greater than a threshold fundamental switching frequency during the initial time interval or a subsequent time interval;
executing, by the electronic data processor, software instructions, stored in the data storage device, to change dynamically the fundamental switching frequency of the control signals for the subsequent time interval to reduce electromagnetic noise within a target frequency band if the fundamental switching frequency is equal to or greater than the threshold fundamental switching frequency during the initial time interval or a subsequent time interval, wherein the software instructions comprise a spread-spectrum-control process or frequency-hopping control process to hop, step or change the fundamental switching frequency; and
changing or stepping the fundamental switching frequency by a fixed frequency step between a previous fundamental frequency and a next fundamental frequency based on the previous fundamental frequency, a maximum dither percentage, and a ratio between the maximum dither percentage and a minimum dither percentage.

10. A method for controlling an inverter for an electric machine, the inverter comprising a data storage device capable of storing software instructions and an electronic data processor in communication with the data storage device, the method comprising:
- providing a plurality of control signals to respective control terminals of a switching circuit to operate the switching circuit at an operational fundamental switching frequency of the control signals for an initial time interval;
- determining if the operational fundamental frequency is greater than a threshold fundamental switching frequency during the initial time interval or a subsequent time interval;

executing, by the electronic data processor, software instructions, stored in the data storage device, to change dynamically the fundamental switching frequency of the control signals for the subsequent time interval to reduce electromagnetic noise within a target frequency band if the fundamental switching frequency is equal to or greater than the threshold fundamental switching frequency during the initial time interval or a subsequent time interval, wherein the software instructions comprise a spread-spectrum-control process or frequency-hopping control process to hop, step or change the fundamental switching frequency; and
- changing or stepping the fundamental switching frequency by a fixed frequency step between a previous fundamental frequency and a next fundamental frequency based on the previous fundamental frequency, a maximum dither percentage, and a total number of steps.

11. The method according to claim 10 further comprising:
determining the change or the stepping in fundamental switching frequency in accordance with the following equations:

$$p_{max} = \frac{1}{1 + \text{ceiling}\left(\frac{f_{low}}{f_{switching}}\right)},$$

where $p_{max}$ is the maximum dither percentage, $f_{low}$ is a lowest frequency of concern for electromagnetic interference; $f_{switching}$ is the operational switching frequency of the switching circuit; and where the above ceiling function rounds up the ratio $f_{low}/f_{switching}$ to a nearest or next highest positive integer value;

$$p_{min} = \frac{RBW}{2 * \text{ceiling}\left(\frac{f_{low}}{f_{switching}}\right) * f_{switching}},$$

where RBW is a resolution bandwidth of a receiving device for monitoring electromagnetic interference, $f_{low}$ is a lowest frequency of concern for electromagnetic interference; $f_{switching}$ is the operational switching frequency of the switching circuit; and where the above ceiling function rounds up the ratio $f_{low}/f_{switching}$ to a nearest or next highest positive integer value;

$$N = 2 * \text{ceiling}\left(\frac{p_{max}}{p_{min}}\right),$$

where N is the total number of steps, $p_{max}$ is the maximum dither percentage, $p_{min}$ is a minimum dither percentage, and the ceiling refers to a ceiling function or function in which the ratio of $p_{max}/p_{min}$ is rounded up to a nearest or next highest positive integer value.

12. The method according to claim 11 wherein an average increase in the fundamental switching frequency above a reference fundamental frequency contributes toward a reduction of a duration of the input signal to the switching circuit, an increased slope of the magnitude versus time slope of the input signal to the switching circuit and a reduction of transient short circuit power dissipation of the switching circuit.

13. The method according to claim 9 wherein an average increase in the fundamental switching frequency above a reference fundamental frequency contributes toward a reduction of a duration of the input signal to the switching circuit, an increased slope of the magnitude versus time slope of the input signal to the switching circuit and a reduction of transient short circuit power dissipation of the switching circuit.

14. An inverter for controlling an electric machine, the inverter comprising:
- a switching circuit comprising a low-side switch and a high-side switch, the low-side switch and the high-side switching each having a control terminal and two switched terminals;
- a driver circuit for providing control signals to the control terminals of the switching circuit, the driver circuit operating at an operational fundamental switching frequency of the control signals;
- an electronic data processor;
- a data storage device in communication with the electronic data processor;
- a control module stored in the data storage device, the control module comprising software instructions for execution by the electronic data processor to change dynamically the fundamental switching frequency of the control signals to reduce electromagnetic noise within a target frequency band if the fundamental switching frequency is equal to or greater than a threshold fundamental switching frequency;
- an oscillator providing a local oscillator signal at a fixed or local fundamental switching frequency;
- a frequency multiplier coupled to the oscillator, the frequency multiplier receiving the local oscillator signal at the fundamental switching frequency;
- a frequency multiplier parameter for providing a multiplier M to multiply the local oscillator signal at the fundamental switching frequency to yield a next fundamental switching frequency in accordance with a fixed frequency step, where M is any positive integer greater than or equal to 2.

* * * * *